United States Patent
Wang (10) Patent No.: US 9,207,824 B2
(45) Date of Patent: Dec. 8, 2015

(54) SYSTEMS AND METHODS FOR TOUCH SENSORS ON POLYMER LENSES

(71) Applicant: Hailiang Wang, Camarillo, CA (US)

(72) Inventor: Hailiang Wang, Camarillo, CA (US)

( * ) Notice: Subject to any disclaimer, the term of this patent is extended or adjusted under 35 U.S.C. 154(b) by 70 days.

(21) Appl. No.: 14/224,838

(22) Filed: Mar. 25, 2014

(65) Prior Publication Data

US 2015/0277616 A1  Oct. 1, 2015

(51) Int. Cl.
*G06F 3/044* (2006.01)

(52) U.S. Cl.
CPC .................................. *G06F 3/044* (2013.01)

(58) Field of Classification Search
None
See application file for complete search history.

(56) References Cited

U.S. PATENT DOCUMENTS

| | | | |
|---|---|---|---|
| 7,173,778 B2 | 2/2007 | Jing et al. | |
| 8,247,468 B2 | 8/2012 | Yoneyama et al. | |
| 2009/0146970 A1* | 6/2009 | Lowles et al. | 345/174 |
| 2012/0141736 A1 | 6/2012 | Hotta et al. | |
| 2012/0177920 A1 | 7/2012 | Huang | |
| 2013/0088779 A1 | 4/2013 | Kang et al. | |
| 2013/0095237 A1 | 4/2013 | Kalyankar et al. | |
| 2013/0157008 A1 | 6/2013 | Aytug et al. | |
| 2013/0164545 A1 | 6/2013 | Evans et al. | |
| 2013/0230733 A1 | 9/2013 | Nakamura et al. | |
| 2013/0250414 A1 | 9/2013 | Eguchi et al. | |
| 2013/0286478 A1 | 10/2013 | Furui et al. | |
| 2014/0009834 A1 | 1/2014 | Kalyankar | |
| 2014/0023840 A1 | 1/2014 | Shibayama et al. | |
| 2014/0030488 A1 | 1/2014 | Jung et al. | |
| 2014/0038109 A1 | 2/2014 | Rahman et al. | |
| 2014/0051804 A1 | 2/2014 | Zhou et al. | |

FOREIGN PATENT DOCUMENTS

EP  2275841 A2  1/2011

OTHER PUBLICATIONS

Poor, Alfred "How It Works: The Technology of Touch Screens" Computerworld, Oct. 17, 2012. Printed Mar. 8, 2014. Nine (9) printed pages. http://www.computerworld.com/s/article/9231961/How_it_works_The_technology_of_touch_screens?pageNumber=1.
Walker, Geoff "Fundamentals of Touch Technologies" SID Display Week 2013, Oct. 2013, version 1.3. Printed Mar. 8, 2014. 247 pages. http://www.walkermobile.com/Touch_Technologies_Tutorial_Latest_Version.pdf.
Walker, Geoff "Fundamentals of Touch Technologies" SID Display Week 2014, Jun. 1, 2014, version 1.2. Printed Jun. 23, 2014. 315 pages. http://www.walkermobile.com/Touch_Technologies_Tutorial_Latest_Version.pdf.
Davis, Trevor "Reducing Capacitive Touchscreen Cost in Mobile Phones" Embedded, Feb. 25, 2013. Printed Mar. 14, 2014. Five(5) printed pages. http://staging.embedded.com/design/system-integration/4407698/Reducing-capacitive-touchscreen-cost-in-mobile-phones-.

* cited by examiner

*Primary Examiner* — Gerald Johnson
(74) *Attorney, Agent, or Firm* — Fikret Kirkbir (57) ABSTRACT

This disclosure generally relates to a system comprising a touch sensor on polymer lens and methods for manufacturing such system. The system comprises at least one polymer lens and at least one touch sensor. The system further comprises at least one frame and a base coat. This disclosure also relates to an optoelectronic system comprising the touch sensor on polymer lens.

20 Claims, 9 Drawing Sheets

SYSTEMS AND METHODS FOR TOUCH SENSORS ON POLYMER LENSES

BACKGROUND

1. Technical Field

This disclosure generally relates to a system comprising a touch sensor on polymer lens and methods for manufacturing such system.

2. Description of Related Art

Since touch screens provide an easy interface for human-machine interactions, they recently have found wide range of applications in consumer electronics, such as mobile phones, tablets, global positioning systems (GPS), medical devices, laptops, point-of-sale terminals, point-of-information kiosks, industrial control units, and visual display systems.

Among many types of touch screens, capacitive touch screens are getting more popular as compared to resistive touch screens due to their higher sensitivity to finger touch and good visibility for displays. The capacitive touch screens also allow users to perform functions not possible with resistive touch screens such as changing the orientation of images with thumb and forefinger since they can support multi touch capability. For a summary of touch screen technologies and their features, for example, see publications by: Alfred Poor "How It Works: The Technology of Touch Screens" Computerworld, Oct. 17, 2012; Geoff Walker "Fundamentals of Touch Technologies" 2013 SID Touch Gesture Motion Conference, October 2013; and Trevor Davis "Reducing Capacitive Touchscreen Cost in Mobile Phones" Embedded, Feb. 25, 2013. The entire content of these publications is incorporated herein by reference.

A capacitive touch screen system typically comprises a cover glass (or lens) with a screen printed decorative frame, and a touch sensor made from indium tin oxide (ITO) film deposited on another glass substrate. These two components are separately manufactured and assembled to form a single component by using an optically clear adhesive (OCA). Manufacturing of the currently available capacitive touch sensor involves in several process steps, including deposition of an ITO film on a glass surface by sputtering, then baking the ITO film above its melting point to create a conductive ITO layer, and finally etching the conductive ITO layer by photo or laser lithography to form a sensing circuit. Every manufacturing step adds to the cost of the final device, resulting from materials and elongated manufacturing time. Since every step may have risks for causing defects, losses or decreasing production yield further contribute to the overall cost. In addition, as the size of the capacitive touch screen increases, so does its weight since the typical touch screen comprises two layers of glass.

To reduce the cost and the weight of the touch screen, several different touch screen structures are being developed, such as sensor on-cell type touch screens, sensor in-cell type touch screens, glass lens/film sensor type touch screens, and sensor on glass lens or one glass solution (OGS) type touch screens. In these novel structures, main target is to reduce number of layers of glass incorporated into the system, thereby reducing the touch screen weight and costs.

However, there are still significant technical barriers for in-cell and on-cell type touch screens. For the on-cell type touch screens, the primary issue is the noise injected from the display module, such as liquid crystal display (LCD). As the touch sensor is structured to be closer and closer to the thin film transistor (TFT) switching elements of LCD, this noise substantially grows. In the case of in-cell type touch screen, the touch sensor is implemented within the TFT structure, which is complicated to manufacture, and therefore this type of touch screen is only used for a few high end applications today.

The glass lens/film type touch sensors are also manufactured by using two separate processes to prepare cover lenses and film sensors, and assembling these two components by using an optically clear adhesive.

The sensor on glass lens or one glass solution (OGS) approach may reduce the weight in overall device. This approach consolidates multilayer touch sensor system into a simpler structure and keeps supply chains intact for consumer electronics manufacturers. However, it still faces a number of technical challenges.

To be used as a glass lens, regular glass must be strengthened to prevent the breakage during the device use. The glass lens usually includes a silk screen printed decorative frame on its inner surface. This frame is used to hide the circuitry of the device. These two features of glass lens pose processing difficulties during the process scale up for commercialization. If the process scale up involves sputtering of an ITO layer on a large strengthened glass followed by patterning of the ITO layer, there may be substantial losses during cutting of the large strengthened glasses into small devices, decreasing the process yield. If the process involves small pieces of the strengthened glass, the productivity may dramatically drop.

Furthermore, the silk screen printed decorative frame usually has about 5 micrometers to 10 micrometers thickness. This frame prevents the ITO layer to form a uniform and continuous film during the ITO sputtering process across the glass and over the silk screen printed area. Any disruption in the conductive layer, at the frame to the glass transition regions, would cause device failures. This process may therefore be unsatisfactory.

SUMMARY

This disclosure generally relates to a system comprising a touch sensor on polymer lens and methods for manufacturing such system. The system may comprise at least one touch sensor on polymer lens that may comprise at least one polymer lens and at least one touch sensor. The at least one polymer lens may have at least one outer surface and at least one inner surface. The at least one touch sensor may have at least one outer surface and at least one inner surface. The at least one touch sensor may be positioned on at least one inner surface of the at least one polymer lens.

The at least one touch sensor on polymer lens may further comprise at least one frame positioned between the at least one polymer lens and the at least one touch sensor. The at least one frame may have at least one opening. The at least one opening of the at least one frame may form a void volume. The void volume may substantially be filled with a base coat.

The at least one touch sensor may comprise at least one nanomaterial. The at least one nanomaterial may comprise at least one nanowire, at least one nanoribbon, at least one nanotube, at least one nanoparticle, or any combinations thereof. The at least one nanomaterial may also comprise at least one silver nanowire, at least one copper nanowire, at least one gold nanowire, at least one carbon nanotube, at least one graphene nanoribbon, or any combinations thereof.

The at least one touch sensor may further comprise at least one matrix polymer. The at least one matrix polymer may comprise polyacrylates, polymethacrylates, polyacrylic acids, polymethacrylic acids, polyacrylamide, polymethacrylamide, polystyrene, polymethyl styrene, polyester acrylate, polyurethane acrylate, polyimide acrylate, polyepoxides, or any mixtures thereof. The at least one polymer lens may comprise poly(methyl methacrylate), polycarbonate, poly(ethylene phthalate), poly(ethylene naphthalene), or mixtures thereof.

The at least one polymer lens may have a thickness varying in the range of 0.1 millimeters to 6 millimeters. The at least one touch sensor may have a thickness varying in the range of 10 nanometers to 2,000 nanometers.

The at least one touch sensor on polymer lens may further comprise at least one hard coat layer. The hard coat layer may have at least one outer surface and at least one inner surface. The at least one hard coat layer may be positioned to face the at least one outer surface of the at least one polymer lens. The at least one hard coat layer may be formed on the at least one outer surface of the at least one polymer lens.

The at least one touch sensor on polymer lens may further comprise at least one optical coating layer positioned to face the at least one outer surface of the at least one hard coat layer. The at least one optical coating layer may be formed on the at least one hard coat layer. The at least one optical layer may comprise at least one antireflective layer, at least one antiglare layer, or combinations thereof.

The at least one touch sensor on polymer lens may further comprise at least one protective layer. The at least one protective layer may face the at least one optical coating layer. The at least one protective layer may be formed on the at least one optical coating layer. The at least one protective layer may comprise at least one antistatic layer, at least one antistain layer, at least one hydrophobic layer, or combinations thereof.

The system may be an optoelectronic system including a touch screen and a display. The display may be a liquid crystal display, a light emitting display, a light emitting organic display, a plasma display, an electrochromic display, an electrophoretic display, an electrowetting display, an electrofluidic display, or combinations thereof. The displays may be positioned to face the outer surface of the touch sensor.

A system may also comprise at least one polymer lens, at least one frame, and at least one base coat. The at least one polymer lens may have at least one outer surface and at least one inner surface. The at least one frame may be positioned to face the at least one inner surface of the at least one polymer lens surface. The at least one frame may have at least one opening that forms a void volume. The at least one base coat may be positioned to substantially fill the void volume. The at least one base coat and the at least one frame each may have a thickness. The at least one base coat and the at least one frame may have substantially the same thickness.

The process for making the touch sensor on polymer lens may comprise providing the at least one polymer lens and the at least one frame, positioning the at least one frame to face the at least one inner surface of the at least one polymer lens, applying the at least one base coat to substantially fill the void volume of the at least one frame to thereby form a first component, providing at least one dispersion comprising the at least one nanostructured material, and providing at least one flexible film.

The process for making the touch sensor on polymer lens may further comprise applying the at least one dispersion on the at least one flexible film to form at least one conductive coating on the at least one flexible film; patterning the at least one conductive coating by a laser lithography process to form at least one patterned conductive coating on the at least one flexible film, thereby forming a second component; providing at least one lamination formulation; applying the at least one lamination formulation on the first component; attaching the second component to the first component, thereby forming a third component; and ultraviolet (UV) or thermal curing the third component to form the touch sensor on polymer lens.

These, as well as other components, steps, features, objects, benefits, and advantages will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

The present invention generally relates to systems comprising touch sensors on polymer lenses and methods for manufacturing such systems. The present invention also relates generally to optoelectronic systems including a touch screen and a display, particularly to system such as liquid-crystal displays (LCD), light emitting displays (LED), organic light emitting displays (OLED), polymer light emitting displays (PLED), plasma displays, electrochromic displays, and the like, which may comprise the touch sensors on polymer lenses ("the touch sensor on polymer lens"). The system of current invention also relates to electrophoretic displays, electrowetting displays, electrofluidic displays and other bistable displays such as those incorporated into e-paper, Kindle readers, and the like, which may comprise the touch sensor on polymer lenses.

Figure 1:
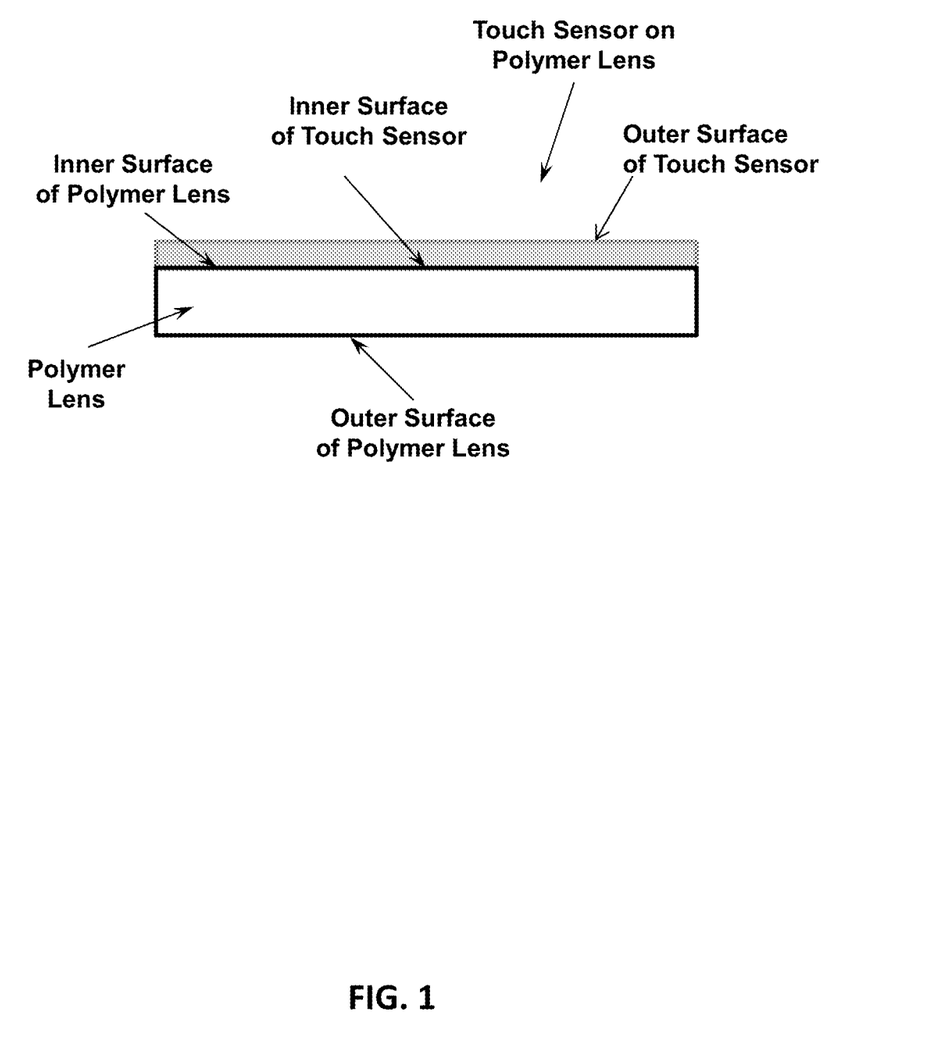
FIG. 1 is a drawing of an exemplary system comprising a touch sensor on polymer lens. Features shown in this cross-sectional view of the system are not drawn to scale.

The touch sensor on polymer lens may comprise at least one touch sensor and at least one polymer lens. The touch sensor may have at least one outer surface and at least one inner surface. An example of such touch sensor on polymer lens is shown in FIG. 1.

The touch sensor on polymer lens may have any shape. It may be flat or curved. For example, it may have a concave shape, a convex shape, a flat shape, or combinations of these shapes.

The touch sensor may comprise at least one nanomaterial. The touch sensor may also comprise at least one patterned nanomaterial. Examples of the at least one nanomaterial may be a nanowire, a nanoribbon, a nanotube, a nanoparticle, and any combinations thereof. The nanostructured material may comprise any material that may be electrically conductive. Examples of such materials may be silver, gold, platinum, copper, aluminum, nickel, stainless steel, carbon, and any combinations thereof. Examples of carbon may be single wall or multiwall carbon nanotube, graphene, and any combinations thereof. Other examples of such electrically conductive materials may be electrically conductive polymers such as polypyrrole, polyaniline, polythiophene, poly(3-methylthiophene), poly(3,4-ethylenedioxythiophene), and any combinations thereof. Further examples of such electrically conductive materials may be electrically conductive ceramics such as indium tin oxide (ITO). Any combinations of these electrically conductive materials may be used in manufacturing of the system comprising the touch sensor on polymer lens. Thus, examples of a nanomaterial may be a silver nanowire, a gold nanowire, a copper nanowire, an ITO nanowire, a single wall carbon nanotube (SWCN), a multi-wall carbon nanotube (MWCN), a graphene nanoribbon, a carbon fiber, a conducting polymer, and any mixtures thereof. The smallest dimension of the at least one nanomaterial may vary in the range of 10 nanometers (nm) to 1,000 nm. The smallest dimension of the at least one nanomaterial may also vary in the range of 10 nm to 200 nm.

The at least one touch sensor may further comprise at least one matrix polymer. Examples of such matrix polymers are polyacrylates, polymethacrylates, polyacrylic acids, polymethacrylic acids, polyacrylamide, polymethacrylamide, polystyrene, polymethyl styrene, polyester acrylate, polyurethane acrylate, polyimide acrylate, polyepoxides, and any mixtures thereof. The matrix polymer may provide structural strength, adhesive strength, and/or protection to the touch sensor. For example, the at least one matrix polymer may form a composite with the at least one nanomaterial that provides protection for at least one nanomaterial that may be mechanically weak. This composite may be in the form of sheet or layer that may have sufficient mechanical strength to withstand handling during the manufacturing and/or use of the system comprising at least one touch sensor on polymer lens. In another example, this matrix polymer may provide sufficient adhesive strength for adhesion of the at least one touch sensor with the at least one polymer lens. In one example, the touch sensor may be formed by a laminating process in which the at least one nanomaterial layer (mesh) is mixed with a coating comprising matrix monomers, matrix oligomers, matrix polymers, or combinations thereof. The matrix monomers or oligomers may form the at least one matrix polymer through polymerization of these monomers, oligomers, for example, using UV or thermal curing processes.

The at least one polymer lens may comprise at least one substrate polymer. Examples of the at least one substrate polymer are poly(methyl methacrylate) (PMMA), polycarbonate (PC), poly(ethylene terephthalate) (PET), poly(ethylene naphthalate) (PEN), and composites thereof.

The at least one polymer lens may have any shape. It may be flat or curved. For example, it may have a concave shape, a convex shape, a flat shape, or combinations of these shapes. For example, the at least one polymer lens may be a transparent polymer sheet with a thickness varying in the range of 0.1 millimeter (mm) to 6 mm. The thickness of the at least one polymer sheet may also vary in the range of 0.1 mm to 2 mm.

The at least one substrate polymer may provide better physical and/or chemical properties than the glass lens. For example, the at least one polymer lens may have similar or higher dielectric constant than a glass lens. In general, polymers may be less fragile as compared to glasses. Mechanical strength of polymers may be much higher than those of glasses. For example, mechanical strength of PMMA is 17 times higher than that of the regular glass. PC may also have higher impact strength than the PMMA. The at least one polymer lens may have similar or higher optical transparency than a glass lens. For example, the light transmittance of PMMA at visible light wavelengths is similar to or higher than the glass. Furthermore, the system comprising the at least one touch sensor on a polymer may be lighter in weight as compared to that comprising a glass lens. For example, PMMA has a density varying in the range of 1.17 g/cm$^3$ to 1.20 g/cm$^3$, which is lower than the glass density. Also, it may be easier to process, e.g. cut, shape, and/or form the substrate polymer as compared to the glass, which may decrease the manufacturing cost of the system comprising the polymer lens.

The at least one polymer lens may have at least one outer surface and at least one inner surface. The at least one touch sensor may have at least one outer surface and at least one inner surface, wherein at least one surface of the touch sensor may be electrically conductive. These said outer and/or inner surfaces may not be in physical contact with (or touch) each other. For example, they may be separated by a basecoat or a frame placed between them. They may also be in contact with each other. One of these said surfaces may substantially completely cover one of the other said surfaces when the at least inner surface of touch sensor is brought in contact with the at least one polymer lens as shown in in FIG. 1.

Figure 2:
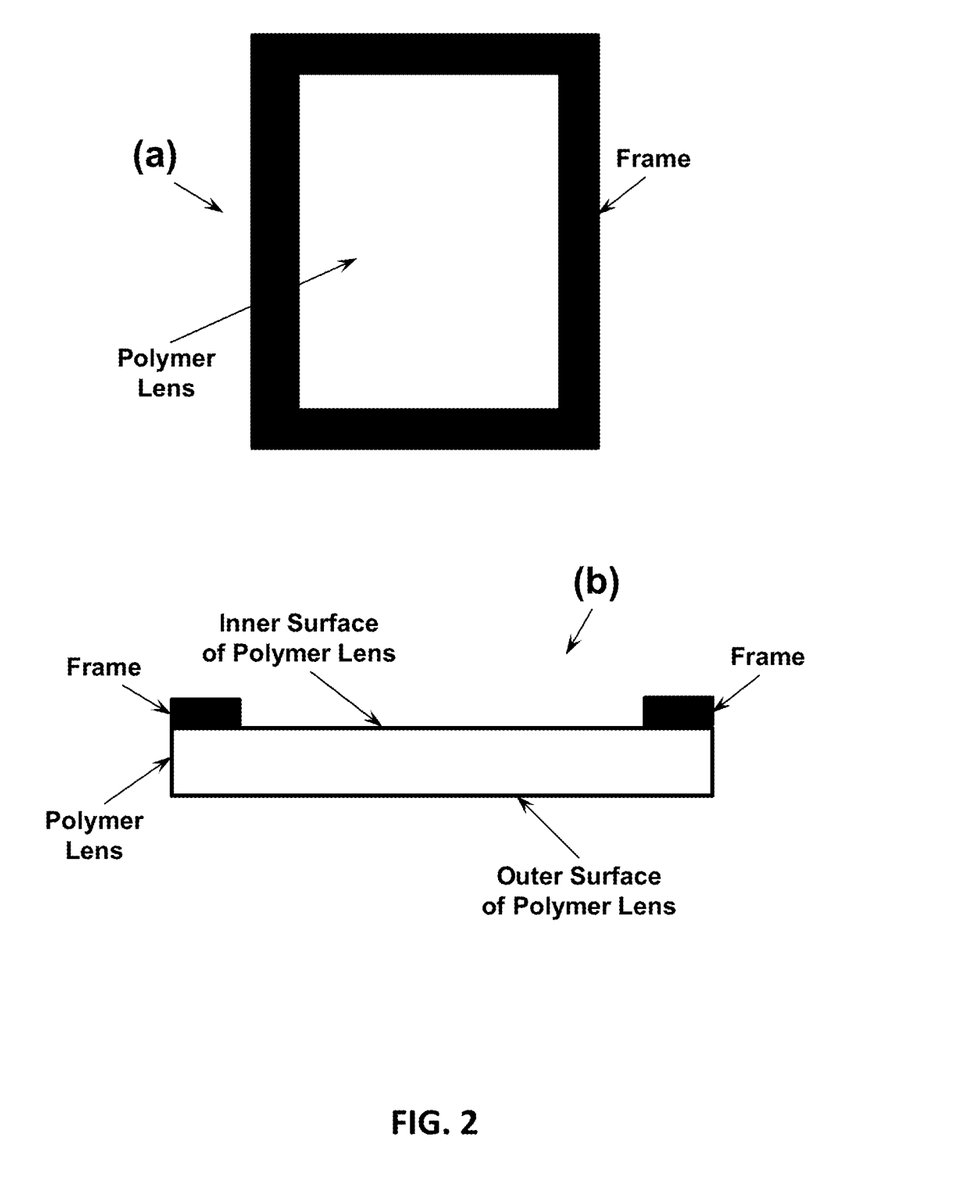
FIG. 2 is a drawing of an exemplary system comprising a frame and a polymer lens: (a) a front view of the exemplary system, and (b) a cross-sectional view of the exemplary system. Features shown in this figure are not drawn to scale.

The system may further comprise at least one frame. This at least one frame may be positioned between the at least one touch sensor and the at least one polymer lens. The at least one frame may have at least one outer surface and at least one inner surface. The at least one frame may be for decorative purposes. It may also provide space for inscriptions, company logos, model numbers, and/or the like. The frame may also hide an electronic circuit when the system comprising at least one touch sensor on a polymer lens is assembled. This frame may have any shape. This frame may have at least one opening (i.e. window) to allow proper functioning of the system. The thickness of the at least one frame may vary in the range of 2 micrometers to 30 micrometers. The thickness of this frame may also vary in the range of 2 micrometers to 5 micrometers. One example of such system further comprising at least one frame is shown in FIG. 2. In this example, the frame is rectangular in shape with a rectangular opening.

The at least one frame and the at least one polymer lens may be positioned to face each other. For example, the at least one frame may be positioned to face the at least one inner surface of the at least one polymer lens. The at least one frame and the at least one polymer lens may not be in physical contact with (or touch) each other. For example, they may be separated by a spacer or another system layer placed between them. They may also be in contact with each other. They may also be formed on each other's surfaces. This formation may be achieved by screen printing process or other physical or chemical process. The exemplary frame shown in FIG. 2 may be formed on the at least one inner surface of the at least one polymer lens.

Figure 3:
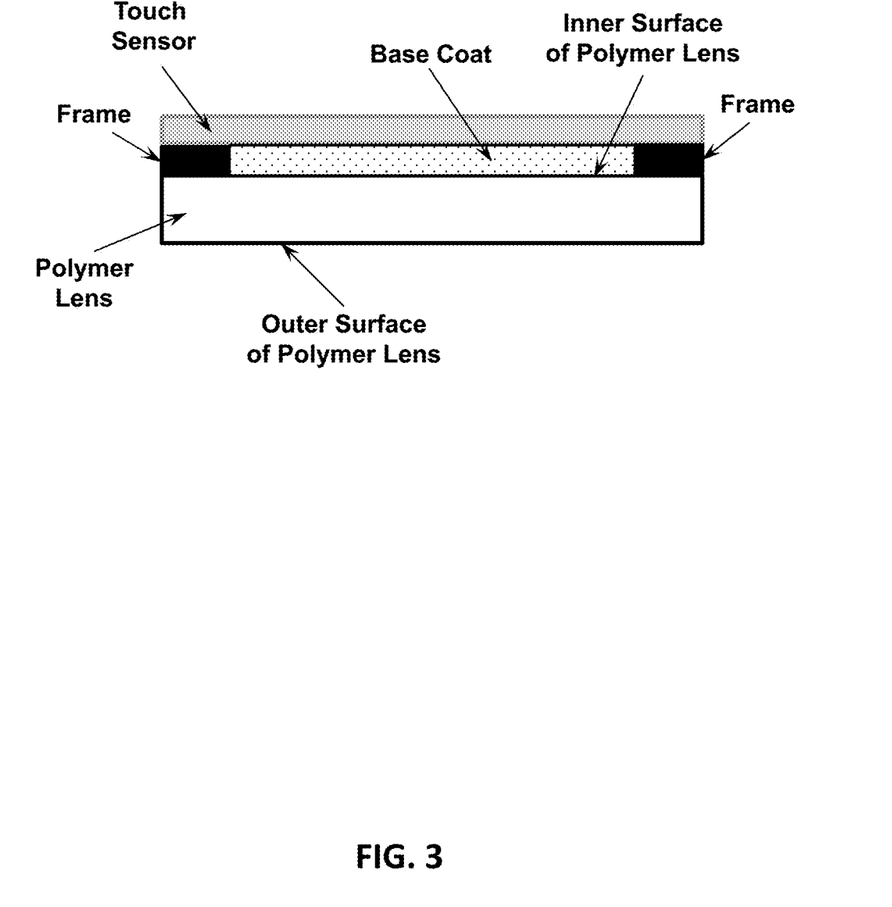
FIG. 3 is a drawing of an exemplary system comprising a touch sensor on polymer lens. Features shown in this cross-sectional view of the system are not drawn to scale.

The system may further comprise a filler. An example of such system is shown in FIG. 3. The at least one opening of the at least one frame may form a void volume surrounded by surfaces of the at least one polymer lens, the at least one touch sensor, and the at least one frame. This void volume may partially or substantially completely be filled with a filler comprising a gas, a liquid, or a solid.

An example of a filler is a base coat, as shown in FIG. 3. This basecoat may be formed by curing a liquid base coat formulation. The base coat may comprise at least one base coat polymer. Examples of such base coat polymers are polyacrylates, polymethacrylates, polyacrylic acids, poly methacrylic acids, polyacrylamide, polymethacrylamide, polystyrene, polymethyl styrene, polyester acrylate, polyurethane acrylate, polyimide acrylate, polyepoxides, and any mixtures thereof. In one example, the base coat polymer may be formed by providing a formulation comprising base coat monomers, base coat oligomers, and base coat polymers, and then curing the base coat formulation. The base coat monomers may be the monomers that form the basecoat polymer through polymerization of these monomers or oligomers for example, using ultraviolet (UV) or thermal curing processes. Composition of the base coat formulation may vary depending on chemical and physical properties of the at least one polymer lens to provide strong adhesion between the base coat and the at least one polymer lens, and between the base coat and the at least one touch sensor. The thickness of the base coat may vary in the range of 2 micrometers to 15 micrometers. The thickness of the base coat may also vary in the range of 2 micrometers to 5 micrometers. The thickness of the base coat may match to that of the at least one frame so that when the void volume is filled with the base coat, the at least one frame and the basecoat may collectively form an even thickness and/or a substantially smooth surface that faces the at least one outer surface of the at least one touch sensor. In an exemplary system shown in FIG. 3, the base coat substantially completely fills the void volume formed by the at least one polymer lens, at least one touch sensor, and the at least one frame.

The system may further comprise a hard coat to provide scratch-resistance and abrasion resistance to the at least one polymer lens. The hard coat may have at least one outer surface and at least one inner surface. The hard coat may prevent or minimize of formation of scratches during the fabrication of the system and its handling by end user, thereby increasing the system durability. The hard coat may be formed on the at least one outer surface of the at least one polymer lens. The thickness of the hard coat may vary in the range of 2 micrometers to 15 micrometers. The thickness of the hard coat may also vary in the range of 5 micrometers to 10 micrometers.

The hard coat may be formed on the at least one outer surface of the at least one polymer lens by any solution deposition method, such as dip coating, spray coating, Mayer rod coating, slot die coating, screen printing and other traditional coating methods followed by any suitable curing method such as thermal curing, UV curing, infrared (IR) curing and the like. For example, a formulation containing silica nanoparticles and UV curable monomer or oligomers comprising acrylates, methacrylates, epoxy function groups, a photo initiator, and an optional solvent may first be deposited on the at least one outer surface of the at least one polymer lens, and then cured on the said surface by UV light. Formulations and methods of deposition of hard coats on polymer substrates are known in the art. For examples of such formulations and methods, see publications: U.S. Pat. No. 7,173,778 "Stain Repellent Optical Hard Coating" to Naiyong Jing et al.; European Patent Application Publication, EP 2275841 A2 "Manufacturing Method of Hard Coat Liquid and Plastic Lens Manufacturing Method Thereof" to Kojima, H. et al.; and U.S. Pat. No. 8,247,468 B2 "Composition for Hard Coat, Article Having Hard Coat Layer and Method for Producing the Article" to Yoneyama K. et al. The entire content of these publications is incorporated herein by reference.

The system may further comprise at least one functional coating. The at least one functional coating may have at least one outer surface and at least one inner surface. These functional coatings may provide additional optical and/or protective properties to the system. Examples of such optical coating coatings may be antireflection coatings, antiglare coatings, and combinations thereof. Examples of such protective coatings may be antistatic coatings, anti-stain coatings, hydrophobic coatings, fingerprint proof coatings, and combinations thereof. The at least one functional coating may be formed on the surface of the hard coat by any solution deposition method, such as dip coating, spray coating, Mayer rod coating, slot die coating, screen printing, and other traditional coating methods followed by any suitable curing method such as thermal curing, ultraviolet (UV) curing, infrared (IR) curing and the like.

At least one antireflective coating may improve transparency of the polymer lens. The at least one antireflective coating may comprise at least one antireflective layer. The at least one antireflective coating may be formed on a hard coat layer or on another at least one functional coating. Formulations and methods of deposition of multilayer antireflection coatings are known in the art. For example, see publications: United States Patent Application Publication, US2014/0038109 "Antireflective Coating Composition and Process Thereof" to Rahman, D. M. et. al.; United States Patent Application Publication US2014/0009834 "Novel Antireflective Coatings with Graded Refractive Index" to Kalyankar, N. D.; United States Patent Application Publication US2013/0164545 "Compositions for Antireflective Coatings" to Evans, J. P. et al.; United States Patent Application Publication US2013/0095237 "Sol-Gel Based Antireflective Coatings Using Alkyltrialkoxysilane Binders Having Low Refractive Index and High Durability" Kalyankar, N. D. et al.; United States Patent Application Publication US 2014/0051804(A1) "Polysilanesiloxane Resins for Use in an Antireflective Coating" to Xiaobing Zhou et al.; and United States Patent Application Publication US 2014/0023840(A1) "Anti-reflection Film and Method of Producing Same" to Shibayama, N. et al. The entire content of these publications is incorporated herein by reference.

The readability of the device may be improved by adding an antiglare coating on the surface of the hard coat. Formulation and method of applying antiglare coating on the surface of the hard coat is known in the art. For example, see publications: United States Patent Application Publication US2013/0286478 "Anti-Glare Film, Method for Producing Anti-Glare Film, Polarizer and Image Display Device" to Furui, G. et al.; United States Patent Application Publication US2013/0230733 "Resin Particles and Process for Producing Same, Antiglare Film, Light-Diffusing Resin Composition, and External Preparation" to Nakamura, M. et al.; United States Patent Application Publication US2012/0177920 "Antiglare and Antiseptic Coating Material and Touchscreen Coated with the Same" to Huang, Y. H.; United States Patent Application Publication US2012/0141736 "Antiglare Hard Coat Film" to Hotta, T. et. al.; United States Patent Application Publication US 2013/0250414(A1) "Antiglare Film, Polarizer, and Image Display Device" to Eguchi, J. et al.; and United States Patent Application Publication US 2013/0088779(A1) "Antireflective and Antiglare Coating Composition, Antireflective and Antiglare Film, and Method for Producing Same" to Kang, J. K. et al. The entire content of these publications are incorporated herein by reference.

Anti-fingerprint coatings are also known in the art. For example see publications: United States Patent Application Publication US2014/0030488 "Panel with Anti-Fingerprint Property and Manufacturing Method Thereof" to Jung, D. et al.; and United States Patent Application Publication US2013/0157008 "Anti-Fingerprint Coatings" to Aytug, T. et al. The entire content of these publications are incorporated herein by reference.

The disclosure is illustrated further by the following additional examples that are not to be construed as limiting the disclosure in scope to the specific procedures or products described in them.

Examples 1 to 4

Examples of Systems Comprising Touch Sensors on Polymer Lenses

In this example, exemplary systems comprising touch sensors on polymer lenses are disclosed.

In the first example, a system comprises at least one touch sensor and at least one polymer lens. This exemplary system is schematically shown in FIG. 1. The at least one touch sensor is formed on the at least one inner surface of the at least one polymer lens.

In the second example, a system comprises at least one touch sensor, at least one polymer lens, at least one frame, and a basecoat. This exemplary system is schematically shown in FIG. 3. The at least one frame is positioned between the at least one polymer lens and the at least one touch sensor. The base coat and the at least one frame is formed on the inner surface of the at least one polymer lens. The at least one touch sensor is formed on the surface collectively formed by the at least one frame and the base coat. In this Example, the base coat substantially completely fills the void volume formed by the at least one frame.

Figure 4:
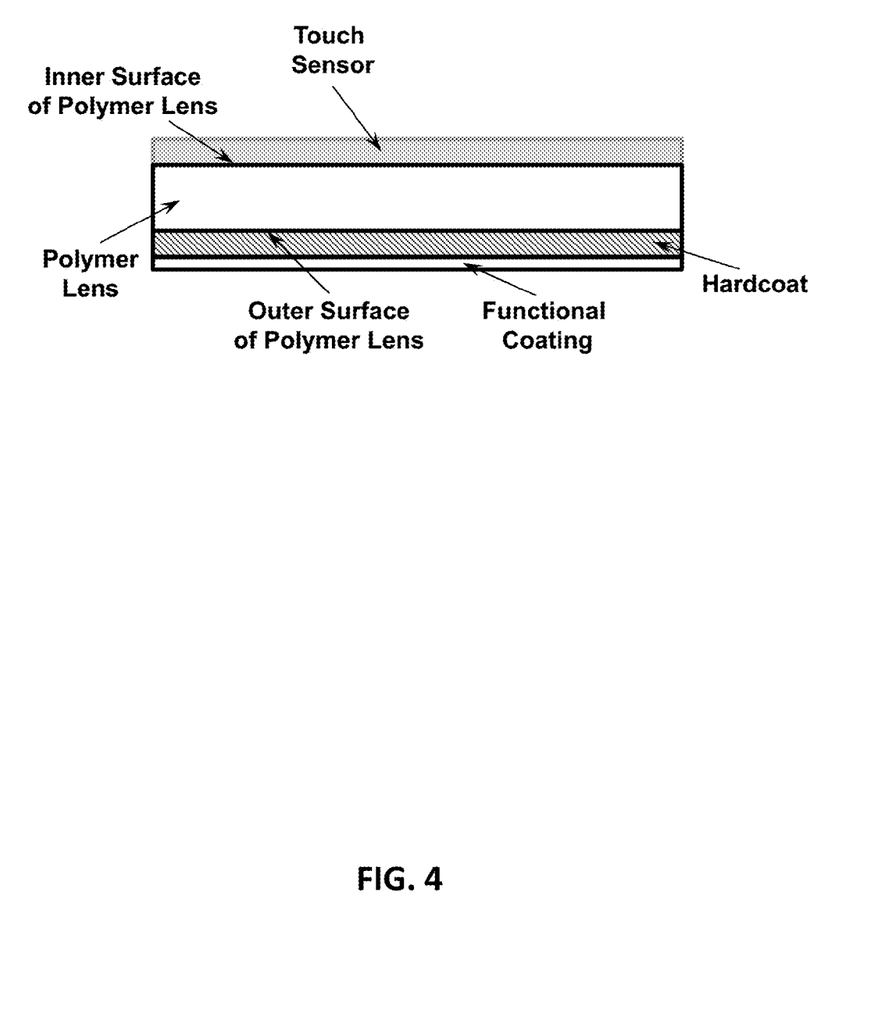
FIG. 4 is a drawing of an exemplary system comprising a touch sensor on polymer lens. Features shown in this cross-sectional view of the system are not drawn to scale.

In the third example, a system comprises at least one touch sensor, at least one polymer lens, at least one hard coat, and at least one functional coating. This exemplary system is schematically shown in FIG. 4. The at least one touch sensor is formed on the at least one inner surface of the at least one polymer lens. The hard coat is formed on the at least one outer surface of the at least one polymer lens. The at least one functional coating is formed on the at least one outer surface of the hard coat.

Figure 5:
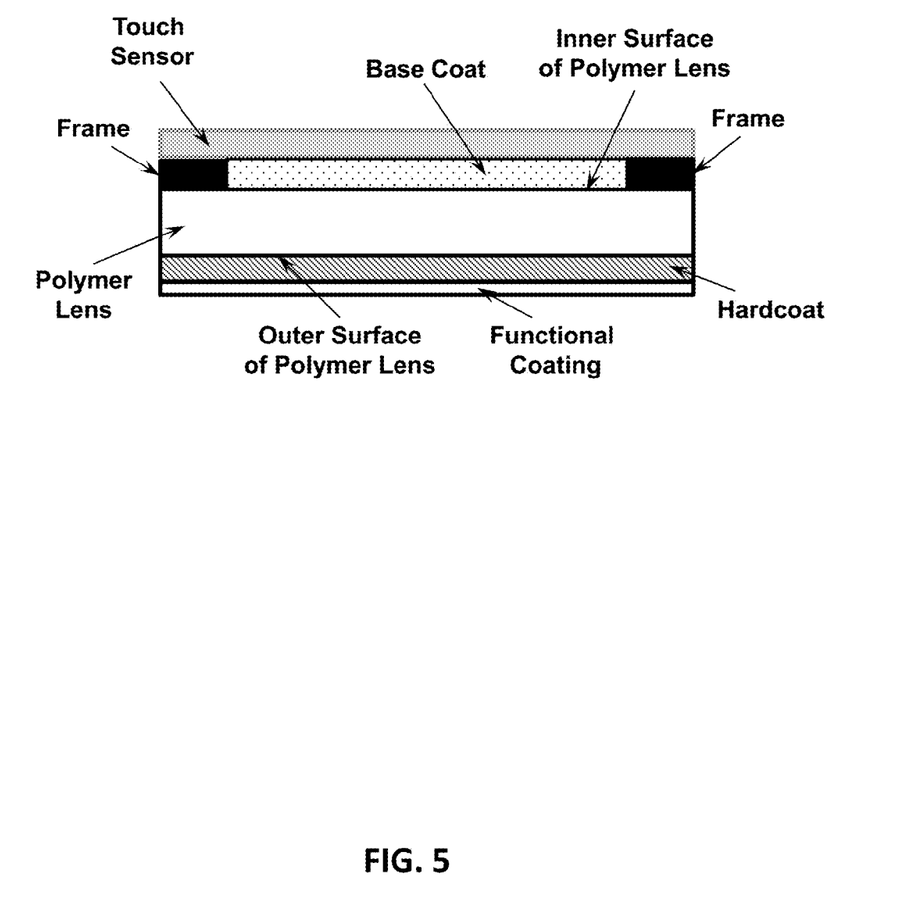
FIG. 5 is a drawing of an exemplary system comprising a touch sensor on polymer lens. Features shown in this cross-sectional view of the system are not drawn to scale.

In the fourth example, a system comprises at least one touch sensor, at least one polymer lens, at least one frame, a base coat, a hard coat, and at least one functional coating. This exemplary system is schematically shown in FIG. 5. The at least one frame is positioned between the at least one polymer lens and the at least one touch sensor. The base coat and the at least one frame are formed on the inner surface of the at least one polymer lens. The at least one touch sensor is formed on the surface collectively formed by the at least one frame and the base coat. In this example, the base coat substantially completely fills the void volume formed by the at least one frame. The hard coat is formed on the at least one outer surface of the at least one polymer lens. The at least one functional coating is formed on the at least one outer surface of the hard coat.

Example 5

Method of Manufacturing of a System Comprising Touch Sensor on Polymer Lens

Figure 6:
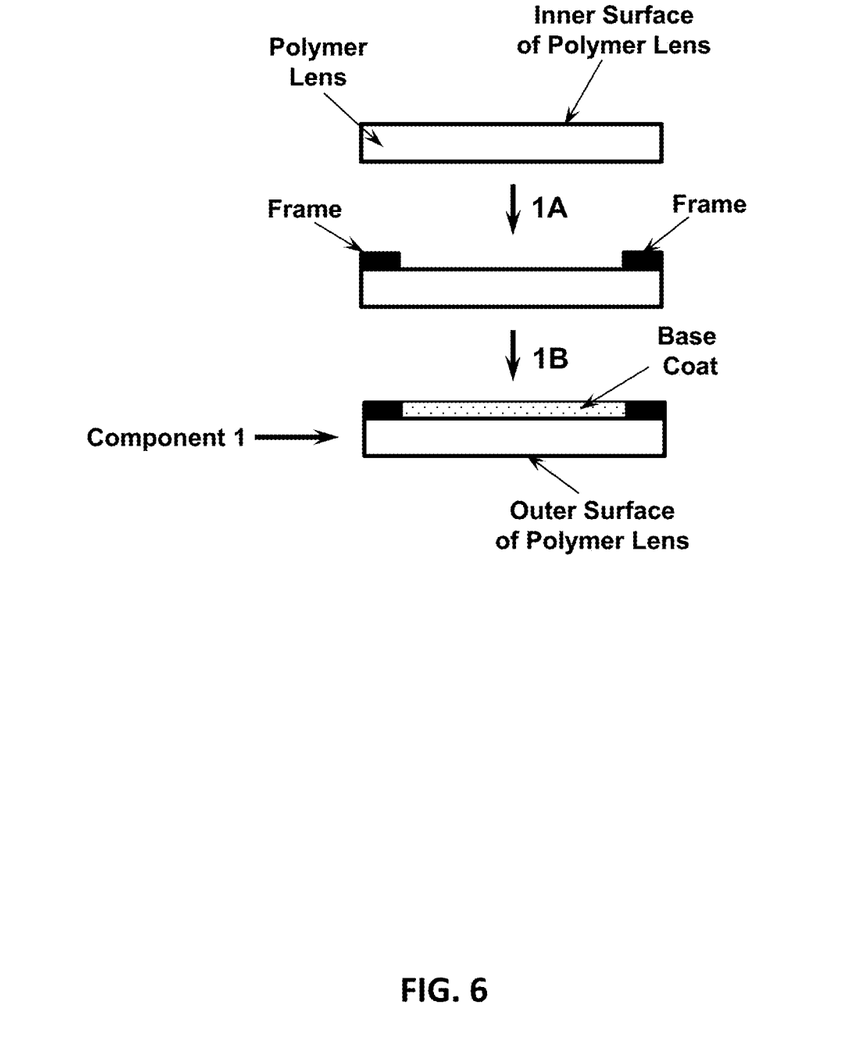
FIG. 6 is a drawing of an exemplary method of forming a Component 1. Features shown in this cross-sectional view of the system comprising the Component 1 are not drawn to scale.
Figure 7:
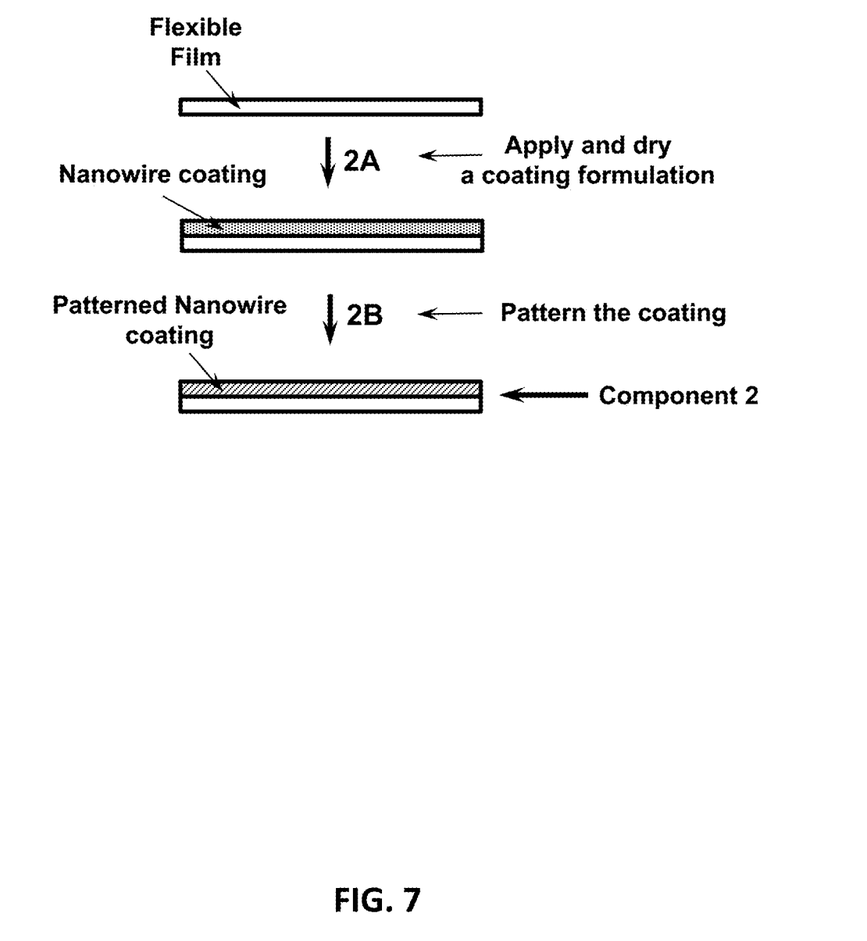
FIG. 7 is a drawing of an exemplary method of forming a Component 2. Features shown in this cross-sectional view of the system comprising the Component 2 are not drawn to scale.
Figure 8:
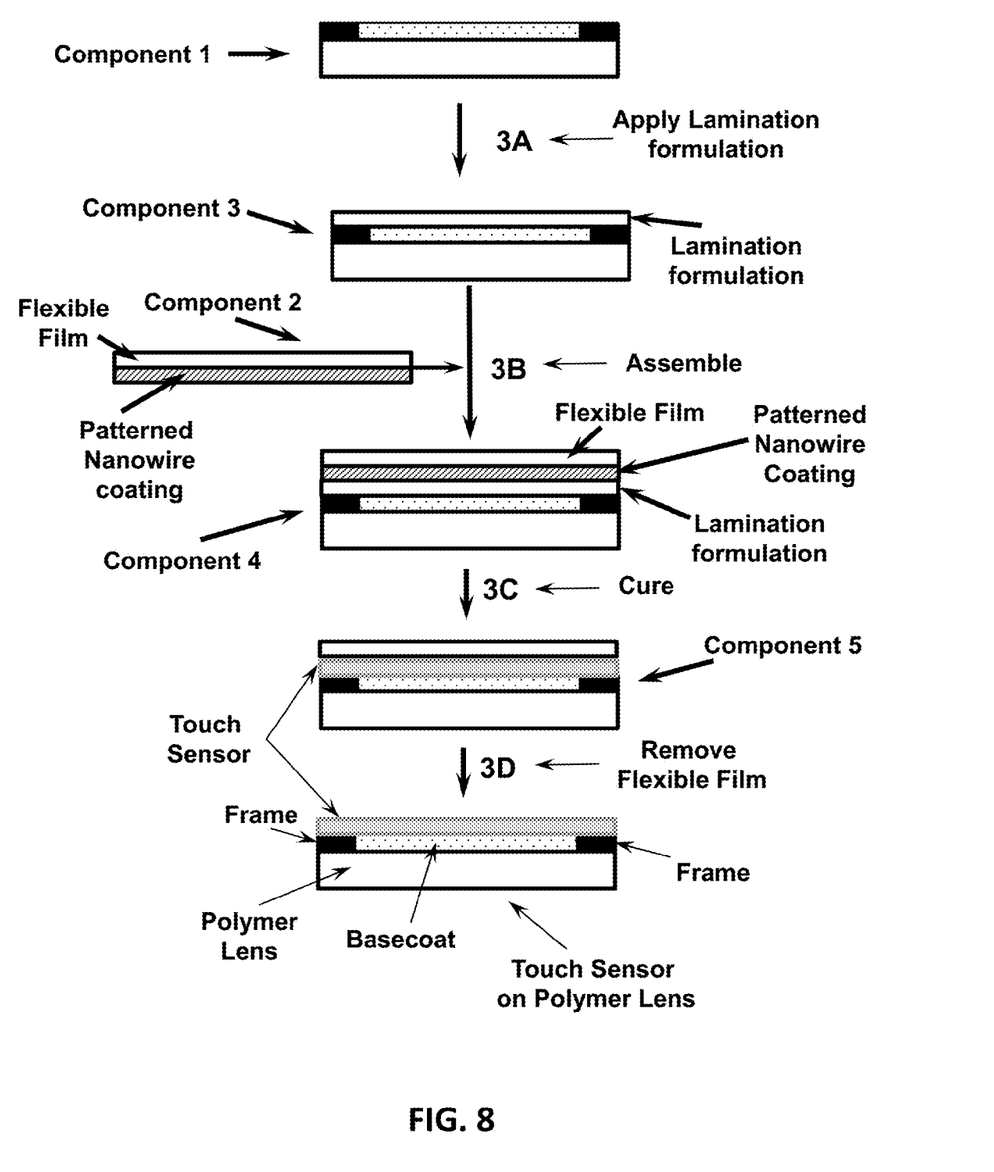
FIG. 8 is a drawing of an exemplary method of forming a system comprising at least one touch sensor on polymer. Features shown in this cross-sectional view of said system are not drawn to scale.

In this example, an exemplary method for manufacturing of a system comprising at least one touch sensor on polymer lens is disclosed. The method is schematically shown in FIGS. 6-8.

A Component 1 is prepared as follows. First, a polymer lens is provided, as shown in FIG. 6. This polymer lens may comprise a flat polymer sheet. Then, a frame is formed on the inner surface of the polymer lens, FIG. 6(1A). This frame may be formed by using a silk screen printing techniques known in the industry. A front view of this frame is shown in FIG. 2. This frame has a window (i.e. opening), forming a void volume. This void volume is substantially completely filled with a filler, FIG. 6(1B). This filler may be a base coat. The frame and the base coat collectively form an even thickness and a substantially smooth surface. The Component 1 comprising a polymer lens, a frame, and a base coat is thereby prepared.

A company logo and/or a functional key design may be implemented during the silk screen printing. A multi decorative frame may be printed by using one silk screen printing process on a large sheet of polymer lens. For a polymer lens comprising PMMA or PC, the lens may be coated by a base coat by using a drawdown machine with #0 or #2.5 Mayer rod. The excess liquid base coat formulation may be removed, leaving liquid base coat leveled within the void volume of the frame. The liquid base coat formulation is cured by using UV or thermal curing techniques to have a solidified basecoat and a smooth and flat surface collectively formed by the frame and the base coat.

A Component 2 is prepared as follows. First, a flexible film is provided, as shown in FIG. 7. This flexible film may be a flat polymer sheet. Then, a nanowire coating is formed on a surface of the flexible film. This coating may need to be dried. The drying of this coating forms a dry and continuous electrically conductive coating on the flexible film, FIG. 7(2A). This continuous electrically conductive coating is patterned by laser lithography process to form a patterned electrically conductive coating on the flexible film, FIG. 7(2B). The Component 2 comprising a flexible film and a patterned electrically conductive coating is thereby prepared.

The flexible film may comprise a flexible film polymer. The flexible film polymer may have good dimensional thermal stability. Examples of the flexible film polymer may be poly(ethylene phthalate) (PET), poly(ethylene naphthalene) (PEN), polyimide films, and composites thereof. Surface of the flexible film may be pretreated with a releasing agent before the formation of the nanowire coating on the surface of the flexible film. Examples of releasing agents may be zinc stearate based mold release agents, silicone based mold releasing agents, polysiloxane based mold release agents, polyvinyl alcohol, and mixtures thereof.

A suitable nanowire coating may be prepared as follows. First, a dispersion may be prepared by dispersing a nanowire in water or an organic solvent. A dispersant may also be added to the dispersion. Examples of organic solvents may be alcohols, ketones, ethers, esters, acetates and the mixtures thereof. Examples of organic solvents may also be methanol, ethanol, isopropanol, 2-methoxyethanol, 1-methoxy-2-propanol, ethyl acetate, n-butyl acetate, t-butyl acetate, 2-propoxyethanol, propylene glycol monomethyl ether acetate, and mixtures thereof. Solid content of the nanowire in the dispersion may vary in the range of 0.1 milligram/milliliter (mg/ml) to 2.0 mg/ml. The solid content of the nanowire in the dispersion may also vary in the range of 0.2 mg/ml to 0.6 mg/ml.

The nanowire dispersion may be deposited on the surface of the flexible substrate by any method known in the art. Examples of these deposition methods may be spray coating method, slot die coating method, Mayer rod coating method, dip coating method, and microgravure coating method. Equipment for such coating methods may be commercially available.

The nanowire dispersion may be treated by any suitable method that may yield a dry nanowire coating on the flexible film. Examples of such methods may be thermal annealing, UV drying, washing and rinsing with water or organic solvent, and combinations thereof. A thermal annealing process may be used. Annealing temperature may be at least 100° C. Annealing temperature may also be at least 150° C. The nanowire coating may be annealed for period to provide a dry nanowire coating. Annealing time may be at least 10 minutes.

Laser lithography method may be used to pattern the nanowire coating. A high resolution pattern may be formed by this technique. Equipment for laser lithography may be commercially available. For example, the laser lithography equipment from ShengXiong Laser Equipment Inc. (Dongguan, China) may provide a pattern controlled at line widths as small as about 20 micrometers with etching speeds of about 1500 millimeters/second (mm/s).

As shown in FIG. 8, the Component 1 and the Component 2 are assembled to form a touch sensor on polymer lens as follows. First, a lamination formulation was applied on the smooth surface collectively formed by the frame and the base coat, FIG. 8(3A).

Suitable deposition technique for lamination formulation may be spray coating, dip coating, Mayer rod coating, slot die coating and microgravure coating. For example, the lamination formulation may be deposited on said smooth and flat surface of the Component 1 by using a Mayer rod #2.5 and an EC-200 automatic drawdown machine. The Component 3 may thereby be prepared.

This lamination formulation may comprise a monomer or oligomer, and a curing catalyst. Examples of monomers may be acrylate, methacrylate, acrylic acid, methacrylic acid, acrylamide, methacrylamide, styrene, methyl styrene, polyester acrylate, polyurethane acrylate, polyimide acrylate, various epoxies, and a mixture thereof. Examples of curing catalysts may be free radical catalysts such as benzoin, benzoin alkyl ethers, acylphosphine oxides, 1,1-diethoxyacetophenone, 1-benzoylcyclohexanol, benzophenone, 2,2-dimethoxy-2-phenylacetophenone, 2-methyl-1-[4-(methylthio)phenyl]-2-(4-morpholinyl)-1-propanone, 1-hydroxycyclohexyl phenyl ketone, and the like; and cationic UV curing catalysts such as diaryliodonium salt, dialkylphenacylsulfonium, ferrocenium salt, triarylsulfonium salt and the like; and mixtures of these free radical and/or cationic UV curing catalysts. The lamination formulation may further comprise small amount of solvent to dissolve the catalyst or other agents such as antioxidants.

Amount of the curing catalyst may be at least about 0.1 gram per 100 grams of monomer, or at least about 0.5 gram per 100 grams of monomer, or at least about 1 gram per 100 grams of monomer, or at least about 2.0 grams per 100 grams of monomer. Amount of the curing catalyst may be no more than about 15.0 grams per 100 grams of monomer, or no more than about 10.0 grams per 100 grams of monomer, or no more than about 7 grams per 100 grams of monomer, or no more than about 5 grams per 100 grams of monomer.

Then, the Component 2 and the Component 3 are assembled to form a Component 4, FIG. 8(3B). The Component 4 thereby prepared comprises a polymer lens, a frame, a basecoat, a lamination layer, a patterned electrically conductive coating, and a flexible film.

A Mayer rod #0 may then be drawn down over the surface of the flexible film to drive air bubbles that may be trapped in the lamination formulation and/or excess amount of lamination formulation out of the Component 4. Air bubble may also be effectively removed from the Component 4 by inserting said component into a plastic bag and then applying vacuum. During this process, the lamination formulation penetrates into all void space of patterned nanowire coating.

The UV curing of the lamination formulation may be carried out by using equipment such as Dymax or Fusion LC-6 conveyor system with Fusion F300s lamp system, FIG. 8(3C). After the UV curing, the patterned nanowire coating and the lamination layer that penetrate each other may be solidified to form the touch sensor. The Component 5 comprising a polymer lens, a frame, a basecoat, a touch sensor, and a flexible film is thereby prepared.

Finally, the flexible film is removed from the Component 5 to form a touch sensor on polymer lens, FIG. 8(3D). The flexible film may provide protection to the touch sensor during the handling of the Component 5. It may be removed any time. It may be removed before it is incorporated into the system.

Example 6

Exemplary System Comprising a Touch Screen on Polymer Lens

Figure 9:
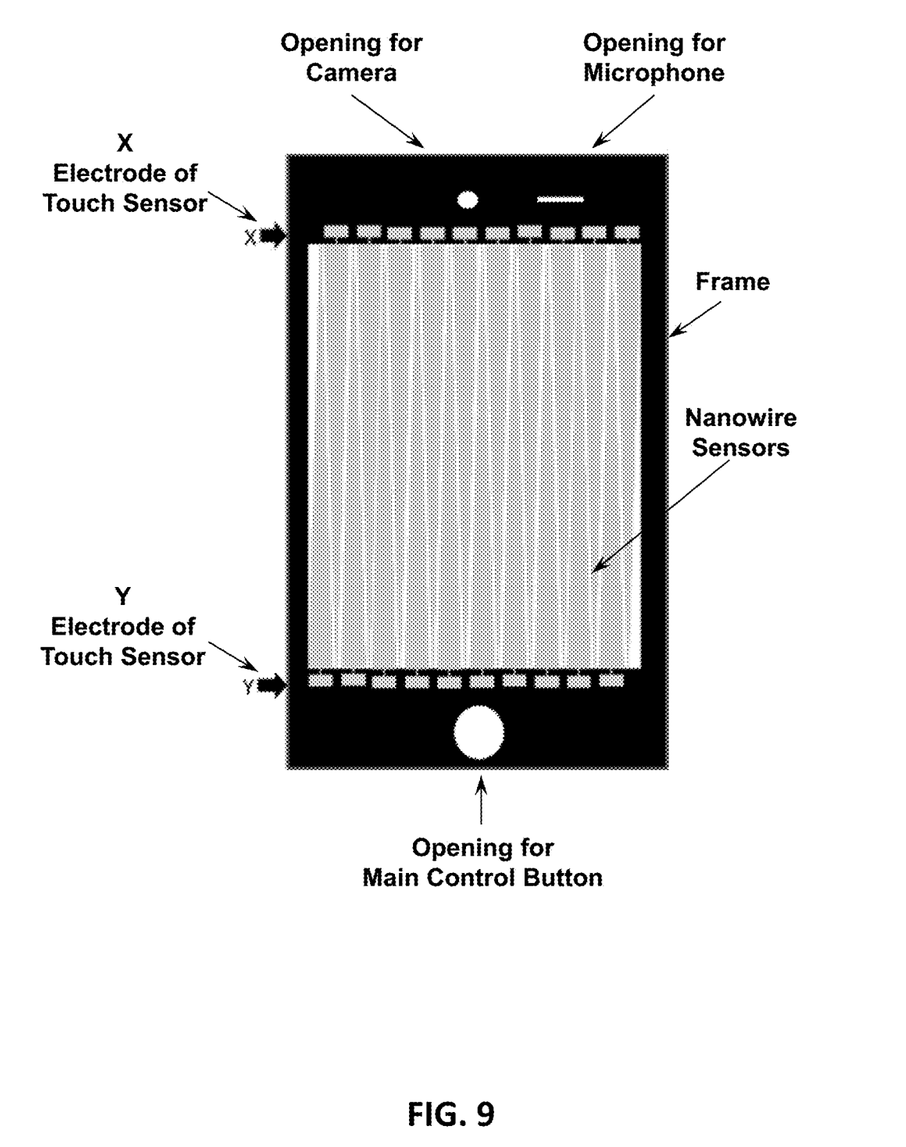
FIG. 9 is a drawing of an exemplary system comprising at least one touch sensor on polymer. Features shown in this frontal view of said system are not drawn to scale.

FIG. 9 schematically shows one example of a system comprising touch screen on polymer lens. The black frame is silk screen printed. The triangular array of x and y electrodes of the touch sensor are shown in the frame window. The circuit lead pad is on the frame. Openings on the frame area are drilled for a main control button, a camera and a microphone.

Example 7

Exemplary Preparation of Component 1

In this example, a Component 1 comprising a polymer lens, a frame and a base coat was prepared. The process steps are schematically shown in FIG. 6.

The PMMA and PC sheets with silk screen printed decorative frame was purchased from Dongguan Spar Electron Co., Ltd. Chemicals for the base coat formulation and the UV lamination formulation were purchased from Sartomer Inc., USA. UV curing of base coat and lamination was performed on Fusion LC-6 Conveyor/Light Shielding System with F300S UV lamp. All coatings were applied using ChemInstruments Inc. EC-200 Variable Speed Drawdown Coater with wire wound rods #0 and #2.5.

The thickness of the PMMA sheet with a silk screen printed decorative frame was about 2 mm thick. A base coat formulation comprising hexanediol diacrylate (HDDA) and trimethylolpropanetriacrylate in 50/50 percent in weight ratio and a curing catalyst of about 3% in weight was prepared. The base coat formulation was deposited on the frame window by using a Mayer rod #0 and EC-200 automatic drawdown machine at a speed of about 5 feet(ft)/minute. The PMMA sheet with the wet base coat was then UV cured by using Fusion F300s lamps and moving the sheet under the lamp by using Fusion UV conveyer system at a speed of about 3 ft/minute for two passes to obtain a fully cured base coat. The Component 1 comprising a polymer lens, a frame and a base coat was thereby prepared.

Example 7

Exemplary Preparation of Component 2

In this example, a Component 2 comprising a flexible film and a patterned nanowire coating was prepared. The process steps are schematically shown in FIG. 7.

Silver nanowires were purchased from Zhejiang Kechuang Advanced Material Co. Ltd., China. A high thermal stability PET film with dimensional expansion of less than 0.5% at about 150° C. was used as the flexible film. A nanowire dispersion comprising the silver nanowires in isopropanol at a concentration of about 0.5 mg/ml was prepared. The nanowire dispersion was deposited on the surface of the flexible film by using Mayer rod #2.5 and EC-200 automatic drawdown machine at a speed of about 5 ft/minute. After the nanowire dispersion coating was dried in air, the article thereby formed was moved to 30 ft long tunnel oven and cured by heating at about 150° C. for about 30 minutes. The cured film was then soaked in a methanol/water bath (about 50/50 ratio in weight) for about 5 minutes and rinsed with a clean methanol/water (about 50/50 ratio in weight) solution. The tunnel curing and the methanol/water treatment were then repeated to obtain fully cured nanowire coating.

The nanowire coating on the PET film was then moved to a laser patterning machine. Laser etching of nanowire mesh was carried out by using SC-K600 from Dongguang Shengxiong Laser equipment Inc., China. The nanowire coating was etched to create a triangular pattern schematically shown in FIG. 9. The gap between the two adjacent triangular electrodes was about 35 micrometers. The Component 2 comprising a flexible film and a patterned nanowire coating was thereby prepared.

Example 8

Exemplary Preparation of Touch Sensor on Polymer Lens

In this example, a touch sensor on polymer lens was prepared. Process steps are schematically shown in FIG. 8.

A UV lamination formulation was first prepared by mixing hexanediol diacrylate (HDDA) with trimethylolpropanetriacrylate at about 70/30 percent ratio in weight and adding a curing catalyst of about 3% in weight to form a lamination formulation. The lamination formulation was deposited on the smooth and the flat surface, which was collectively formed by the frame and the base coat of the Component 1 prepared in Example 6, by using a Mayer rod #2.5 and an EC-200 automatic drawdown machine at a speed of about 5 ft/minute. The Component 3 was thereby prepared. Then, the Component 2 was positioned on the Component 3 with the lamination layer facing the patterned nanowire layer. A Mayer rod #0 was rolled over the surface of the flexible film to drive air bubbles that may have been trapped in the lamination formulation and/or excess amount of lamination formulation out so that lamination formulation can penetrate into voids of patterned nanowire. A Component 4 was then prepared. The Component 4 was then passed through the UV curing system for 2 times at a speed of about 5 ft/minute to fully cure the said article to form a Component 5. After the PET film was peeled off, the touch sensor on polymer lens, schematically shown in FIG. 9, was thereby prepared.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

I claim:

1. A system comprising at least one touch sensor on polymer lens comprising at least one polymer lens and at least one touch sensor, wherein the at least one polymer lens has at least one outer surface and at least one inner surface, and wherein the at least one touch sensor is positioned on at least one inner surface of the at least one polymer lens.

2. The system of claim 1, wherein the at least one touch sensor on polymer lens further comprises at least one frame positioned between the at least one polymer lens and the at least one touch sensor, wherein the at least one frame has at least one opening, and wherein the at least one opening of the at least one frame forms a void volume.

3. The system of claim 2, wherein the void volume is substantially filled with a base coat.

4. The system of claim 3, wherein the at least one touch sensor comprises at least one nanomaterial.

5. The system of claim 4, wherein the at least one nanomaterial comprises at least one nanowire, at least one nanoribbon, at least one nanotube, at least one nanoparticle, or any combinations thereof.

6. The system of claim 4, wherein the at least one nanomaterial comprises at least one silver nanowire, at least one copper nanowire, at least one gold nanowire, at least one carbon nanotube, at least one graphene nanoribbon, or any combinations thereof.

7. The system of claim 4, wherein the at least one touch sensor further comprises at least one matrix polymer.

8. The system of claim 7, wherein the at least one matrix polymer comprises polyacrylates, polymethacrylates, polyacrylic acids, polymethacrylic acids, polyacrylamide, polymethacrylamide, polystyrene, polymethyl styrene, polyester acrylate, polyurethane acrylate, polyimide acrylate, polyepoxides, and any mixtures thereof.

9. The system of claim 3, wherein the at least one polymer lens comprises poly(methyl methacrylate), polycarbonate, poly(ethylene phthalate), poly(ethylene naphthalene), or mixtures thereof.

10. The system of claim 3, wherein the at least one polymer lens has a thickness varying in the range of 0.1 millimeters to 6 millimeters.

11. The system of claim 3, wherein the at least one touch sensor has a thickness varying in the range of 10 nanometers to 2,000 nanometers.

12. The system of claim 3, wherein the at least one touch sensor on the polymer lens further comprises at least one flexible film positioned to face the at least one touch sensor.

13. The system of claim 3, wherein the at least one touch sensor on polymer lens further comprises at least one hard coat layer positioned to face the at least one outer surface of the at least one polymer lens.

14. The system of claim 3, wherein the at least one touch sensor on polymer lens further comprises at least one optical coating layer positioned to face the at least one outer surface of the at least one polymer lens.

15. The system of claim 3, wherein the at least one touch sensor on polymer lens further comprises at least one hard coat layer positioned to face the at least one outer surface of the at least one polymer lens, and at least one optical coating layer positioned to face the at least one hard coat layer.

16. The system of claim 15, wherein the at least one optical coating layer comprises at least one antireflective layer, at least one antiglare layer, or combinations thereof.

17. The system of claim 16, the at least one touch sensor on polymer lens further comprises at least one protective layer, wherein the at least one protective layer is positioned to face the at least one optical coating layer, and wherein the at least one protective layer comprises at least one antistatic layer, at least one anti-stain layer, at least one hydrophobic layer, or combinations thereof.

18. The system of claim 3, wherein the system is an optoelectronic system.

19. The system of claim 18, wherein the system is a liquid crystal display, a light emitting display, a light emitting organic display, a plasma display, an electrochromic display, an electrophoretic display, an electrowetting display, an electrofluidic display, or combinations thereof.

20. The process for making the touch sensor on polymer lens of claim 4 comprising:
 a. Providing the at least one polymer lens and the at least one frame,
 b. Positioning the at least one frame to face the at least one inner surface of the at least one polymer lens,
 c. Applying the at least one base coat to substantially fill the void volume of the at least one frame to thereby form a first component,
 d. Providing at least one dispersion comprising the at least one nanostructured material, and providing at least one flexible film,
 e. Applying the at least one dispersion on the at least one flexible film to form at least one conductive coating on the at least one flexible film,
 f. Patterning the at least one conductive coating by a laser lithography process to form at least one patterned conductive coating on the at least one flexible film, thereby forming a second component,
 g. Providing at least one lamination formulation,
 h. Applying the at least one lamination formulation on the first component,
 i. Attaching the second component to the first component, thereby forming a third component, and
 j. Ultraviolet or thermal curing the third component to form the touch sensor on polymer lens.

* * * * *